United States Patent [19]

Barraud et al.

[11] Patent Number: 4,599,969
[45] Date of Patent: Jul. 15, 1986

[54] DEVICE FOR THE FORMATION AND DEPOSITION ON A SUBSTRATE OF MONOMOLECULAR FILMS

[75] Inventors: André Barraud, Bures-sur-Yvette; Jean Lelcuf, Gif sur Yvette, both of France

[73] Assignee: Commissariat a l'Energie Atomique, Paris, France

[21] Appl. No.: 677,012

[22] Filed: Nov. 30, 1984

[30] Foreign Application Priority Data

Dec. 9, 1983 [FR] France .................................. 83 19770

[51] Int. Cl.⁴ ........................ B05C 3/00; B05C 11/00; B05C 19/02
[52] U.S. Cl. .................................. 118/429; 118/694; 118/712
[58] Field of Search ........................ 118/429, 694, 712

[56] References Cited

FOREIGN PATENT DOCUMENTS 2341199 9/1977 France .
8303165 9/1983 PCT Int'l Appl. .
1582860 1/1981 United Kingdom .

Primary Examiner—Michael R. Lusignan
Attorney, Agent, or Firm—Oblon, Fisher, Spivak, McClelland & Maier

[57] ABSTRACT

Tank for depositing a monomolecular film. It comprises a tank having walls and a base and containing a liquid, a barrier defining two areas on the surface of the liquid, means for displacing the barrier on the surface of the liquid, at least one substrate and means for displacing the substrate. The level of the liquid is below the horizontal rim of the tank. The barrier has a break at each of its ends and rests on the edges of the tank. The break defines a narrower portion partly submerged in the liquid. Sealing means are provided between the faces of the narrower portion and the facing walls.

9 Claims, 7 Drawing Figures

DEVICE FOR THE FORMATION AND DEPOSITION ON A SUBSTRATE OF MONOMOLECULAR FILMS

BACKGROUND OF THE INVENTION

There are numerous applications for monomolecular layers or films of organic compounds, particularly in electronics, where they are used for example for forming metal-insulator-metal structures, in which the thickness of the dielectric layer is particularly carefully controlled.

A known method for producing and depositing monomolecular layers of amphiphilic molecules has been described by Langmuir. According to this method, a solution of amphiphilic molecules dissolved in a solvent which is imiscible with the liquid of the tank is placed on the surface of said liquid. For example, the solvent is chloroform or petroleum ether. The solvent evaporates, leaving behind the molecules partly immersed in the water with their major axis oriented in a random manner. The molecules are straightened by compression using a barrier providing a given surface pressure. The thus formed film can be deposited on a hydrophilic or hydrophobic substrate. Hydrophilic substrates are, for example, oxides such as $Al_2O_3$, $CaF_2$ and $SiO_2$. Hydrophobic substrates are pure metals such as gold, silver or germanium. The monomolecular film is deposited on the surface of the substrate previously immersed in the liquid of the tank by slowly raising the former, whilst maintaining the film at said given surface pressure throughout the duration of the deposition. Use is made of a liquid tight barrier, which is mobile on the surface of the tank liquid for carrying out the compression of the monomolecular film. As a result of the displacement of this barrier, there is a reduction of the area of the monomolecular film previously formed on the surface of the liquid, so as to bring it to the desired surface pressure.

Throughout the operations of producing and depositing the film, absolute cleanness is required, together with the absence of pollution of both the bath and its surface by complexing or surfactant ionic products.

The prior art discloses a large number of tanks permitting the formation and deposition of monomolecular layers or films according to the Langmuir method. For example, the Joyce-Loebel company (Team Valley, Gateshead, G.B.) markets a glass tank with a constant perimeter Teflon tape barrier. The Lauda Company (German Federal Republic) markets a sheet metal tank covered with Teflon, which is of a small size and has a Langmuir balance. Finally, Rev. Sci. Instrum., vol. 46, no. 10 Oct. 75, Peter Fromhertz describes a small circular tank. However, these devices require a high degree of skill for use and suffer from serious cleaning and pollution problems.

Thus, in the case of the tank marketed by Lauda, the mobile barrier is constituted by a strip placed on the rim of the tank. Thus, the latter must contain a very precise liquid quantity and if the quantity is excessive, the tank overflows. If the quantity is inadequate, the meniscus is not formed.

In the case of the tank marketed by Joyce-Loebel, the mobile barrier is constituted by a constant perimeter tape. This system suffers from two disadvantages. Firstly the mechanism has rotary pulleys passing through the surface in the compartment of the film, which shears the fragile monomolecular film and deposits it on the pulleys and on the tape. In addition, said device has areas which cannot undergo surface cleaning, inter alia the area of the tank outside the tape, where the film formed by the impurities from the water cannot be compressed in order to be collected and subject to suction action.

SUMMARY OF THE INVENTION

The present invention relates to a tank which obviates these disadvantages. More specifically, the present invention relates to a tank for the deposition of a monomolecular film the tank having walls with a horizontal rim and a base, the tank containing a liquid, a barrier defining two areas on the surface of the liquid, means for displacing the barrier on the surface of the liquid in a direction perpendicular to the barrier, a solvent placed on the surface of the liquid and containing dissolved molecules, at least one substrate, means for displacing the substrate in a vertical direction and means for measuring the tension on the surface of the liquid, wherein the level of the liquid is below the horizontal rim of the tank, the barrier having a break at each of its ends and resting on the edges of the tank by said break, the break also defining a narrower portion which is partly submerged in the liquid of the tank, sealing means being provided between the faces of the narrower portion and the facing walls.

According to another feature, the means for displacing the barrier are constituted by a first and second pulley located at a first end of the tank, by four pulleys located at a second end of the tank, by a motor driving a capstan and by a cable passing over each of the said pulleys and rotated by the capstan, the ends of the barrier being fixed to the cable and moving in the same direction.

Preferably, the barrier has a detachably fixed bracket, the cable being fixed to the end of the bracket.

As a result of the aforementioned arrangements and others which will appear from reading the description of an exemplified embodiment, the tank can be used by someone not skilled in the art and makes it possible to solve the problems caused by the various molecules presently used for forming Langmuir films.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
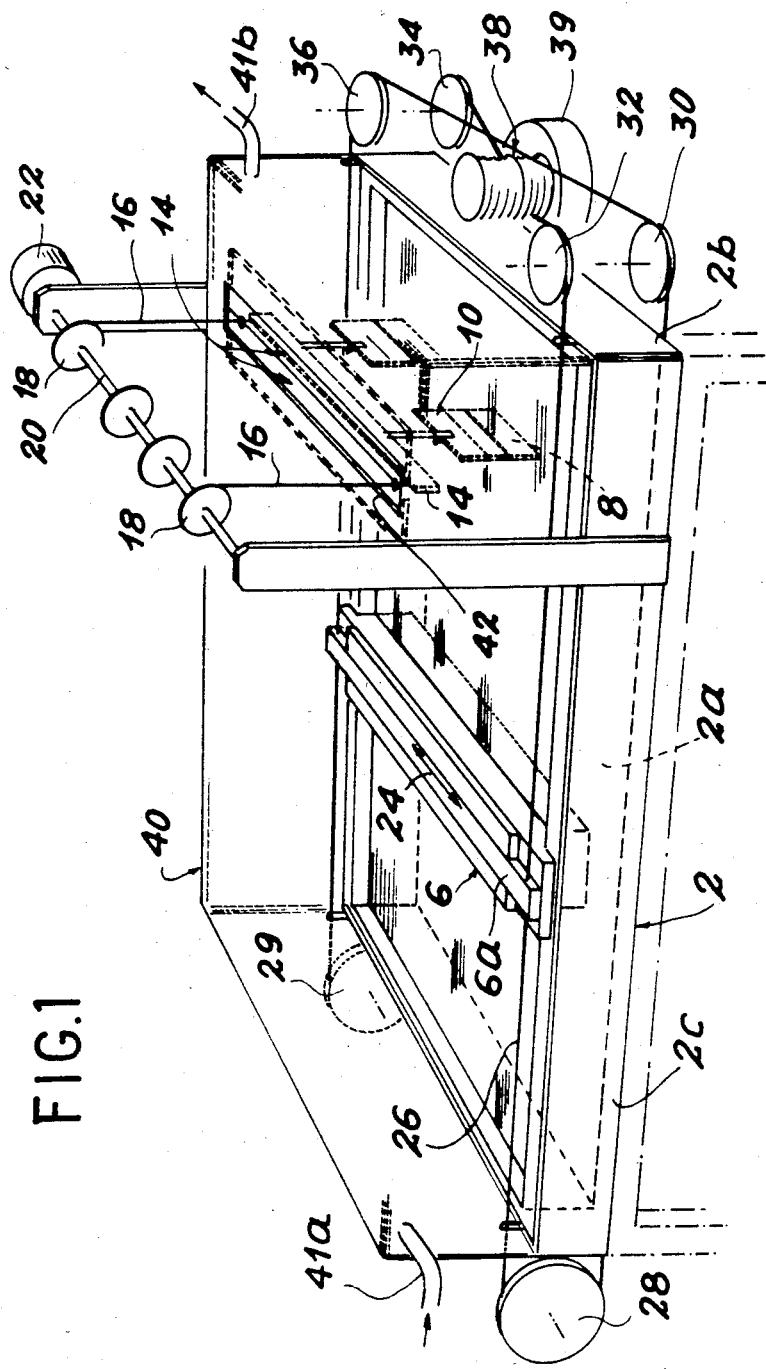
FIG. 1 is a perspective view of a tank according to the invention.

In FIG. 1, tank 2 is rectangular, but other shapes are possible. For example, the tank could be circular. It is formed by two parallel, longitudinal walls 2a, which are vertical, but could also be inclined with respect to the vertical. The tank also has two side walls 2b, located at the ends of walls 2a and a base 2c. The rim of the tank is horizontal, at least on the edge of sides 2a.

Sides 2a, 2b and base 2c are made from high pressure polytetrafluoroethylene (PTFE). This material has a high chemical inertia and a low porosity. It has the advantage, compared with glass, of not releasing ions. Compared with other plastic materials, it has the advantage of not desorbing organic molecules. Compared with ordinary PTFE, it has the advantage of not trapping either the solvent or ions. Compared with deposited PTFE, it has the advantage of being impermeable to the ions of the metal walls.

The tank is formed from assembled elements. The walls and the base can be joined by adhesion. They can also be assembled by toggle joints, i.e. mortises made in the parts to be assembled and into which is inserted a key. The tank has mechanical reinforcements of a metallic, plastic or laminate type. These reinforcements are constituted e.g. by angle irons located along the longitudinal sides and beneath the base of the tank and are screwed down. This makes it possible to reduce the cost thereof and to form large tanks, despite the use of high pressure PTFE which is only available in small volumes.

Conventionally tank 2 contains a liquid called the subphase or underphase. For example, this liquid is water. On to the liquid is spread a solution of amphiphilic molecules dissolved in a solvent. The solvent evaporates, leaving the molecules partly submerged in water. The molecules are straightened by compression using a barrier 6 at a given surface pressure. A substrate attached to a clip 10 in which it is accurately positioned is moved in a vertical direction. The monomolecular film can be deposited on the substrate during the raising or lowering of the latter. In the embodiment shown in FIG. 1, clip 10 is fixed to the end of a vertical bar 12, which is itself secured to a cross-bar 14. At its two ends, the cross-bar 14 is suspended on two wires 16, which are wound on to wheels 18. The latter are fixed to a shaft 20 rotated by an electric motor 22. Such a lifting device is not subject to friction, i.e. it is able to ensure a continuous displacement without jerking the substrate, even at low speed.

According to the feature of the invention, barrier 6 is partly submerged in liquid 4. Thus, in the prior art devices, the level of the liquid is flush with the edges of the tank and the mobile barrier is in the form of a strip engaged on the edges of the tank. It is therefore necessary to accurately measure the liquid quantity introduced into the tank. There are also risks of overflowing.

The invention has a barrier of a special type, which obviates these disadvantages. The barrier is partly submerged in liquid 4. At its two ends it rests on the longitudinal edges of walls 2a and has breaks making it possible to partly submerge it in liquid, as will be described in greater detail relative to FIGS. 2 to 4. Barrier 6 comprises a bracket 6a, which simply rests in a longitudinal slot of the barrier. The bracket can move freely in translation in the longitudinal direction of the barrier, as indicated by arrow 24. The ends of the bracket 6a are fixed to a drive cable 26. FIG. 1 shows the circuit of said cable. It comprises two pulleys 28, 29, which rotate freely and whose axis is horizontal. They are located at a first end of tank 2 to the left in FIG. 1. Moreover, two vertically axes, freely rotatable pulleys 32, 24 as well as two further freely rotatable pulleys, are located at the other end of the tank. The circuit also comprises a capstan 38 on to which is wound the cable 26 and which is driven by a motor 29. From pulley 32, the cable passes on to capstan 38, then on to pulley 34, followed by pulleys 29, 36, 30 and finally pulley 28 before returning to pulley 32. One end of the bracket 6a is fixed to the strand of the cable located between pulleys 29 and 36, whilst the other end is fixed to the strand of the cable located between pulleys 28 and 32. Thus, the two ends of bracket 6a move in the same direction and at the same speed. This drive system maintains the lateral faces of the mobile barrier 6 parallel to the tank side walls.

The bracket can be instantaneously disengaged from the barrier by lifting and can be easily reengaged by gravity. This drive device permits a very easy interchange of the mobile barrier 6 for cleaning purposes.

Figure 5:
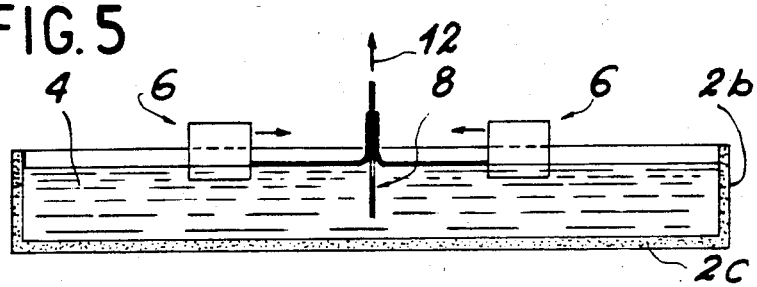
FIG. 5 is a sectional view of a large tank having two barriers.

In the case of very large tanks, it is possible to provide two identical mobile barriers, moving in opposite directions in the manner shown in FIG. 5. The movements of the two barriers can be mechanically or electronically linked in such a way that they move towards one another during the film compression phase. This system is particularly advantageous in the case of rigid films where it is necessary to supply the film perpendicular to each face of the substrate 8, particularly if the latter has a large surface.

Tank 2 is covered with a detachable transparent frame 40 for the purpose of permitting cleaning. Preferably there is a circulation of a neutral gas such as nitrogen within the frame, as is indicated by the supply and discharge ducts 41a, 41b respectively, for the said gas. This has the effect of eliminating the water vapour which inevitably forms and to prevent its condensation on the walls of frame 40. Thus, on dropping, the water droplets would disturb the formation of the film. Frame 40 is matched in an as tight as possible manner to the tank 2. It is necessary to provide an opening 42 for the introduction and removal of the substrate with respect to frame 40. This opening is covered by two sliding flaps 44, which must be rapidly manipulated during the introduction or removal of the substrate, so as to reduce to the greatest possible extent the quantity of neutral gas escaping from the frame.

A measuring probe makes it possible to measure the surface tension of the film. This probe uses the principle of the Wilhelmy method described in the article "Instrumentation for handing monomolecular films at an air-water interface" by Peter Fromhertz, Rev. Sci. Instruments, vol. 46, No. 10, October 1975. According to this method, a strip of filter paper of width e.g. 40 mm is suspended on the end of a spring and acts as a hydrophilic probe. Thus, the surface tension of the film is transformed into a displacement of the filter paper which represents the latter. This displacement is transformed into a tension by an inductive displacement transducer, whose mobile core is connected to the probe.

According to the invention, the sensitivity of the measurement is increased by attaching two strips of filter paper to the transducer bracket. This gives two measuring ranges (0-50 or 0-100 mN/m (milliNewton/meter), as a function of the desired sensitivity. The suspension bracket is detachable. The complete surface tension measuring device is mounted on an arm, which can be raised either automatically or manually to permit the passage of the mobile barrier and the cleaning of the front part of the tank.

Figure 2:
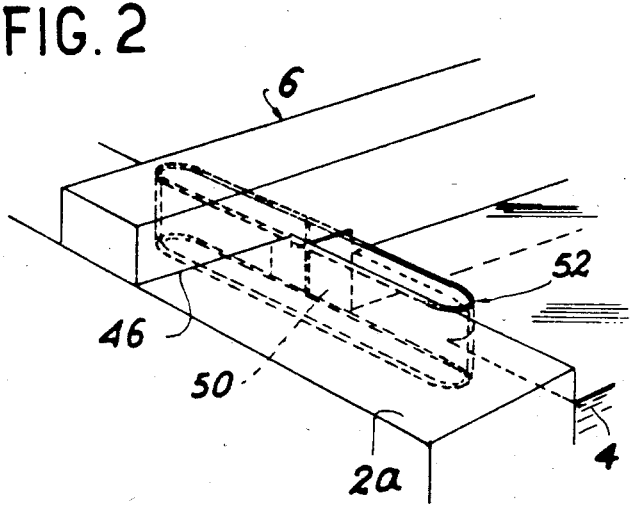
FIG. 2 is a detailed perspective view of a barrier according to the invention.

FIG. 2 is a perspective view of a special construction according to the invention of the mobile barrier 6. The latter has a break 46 at each of its ends. Only one end is shown in FIG. 2, but the other end is symmetrical. Thus, the barrier has a part, whose length is less than the width of the tank and which enters the latter until it is immersed in the liquid. Sealing means are provided between surface 50 of barrier 6 and the face facing the longitudinal wall 2a. In the construction of FIG. 2, the sealing means are constituted by a closed elastic tape fixed to face 50 and which rubs against the face of wall 2a when the barrier moves and which acts as a scraper. This construction ensures complete sealing.

Figure 3:
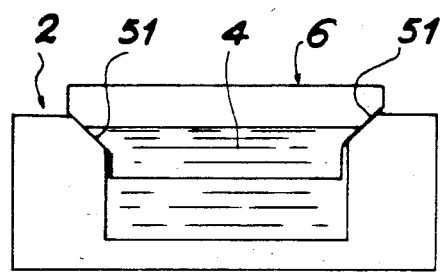
FIG. 3 is first and second variants for the barrier according to FIG. 2.

In the variant of FIG. 3, the angles of faces 2a are chamfered and the barrier 6 is bevelled, so as to match it to the faces 2a and ensure sealing by gravity at chamfers 51.

Figure 4:
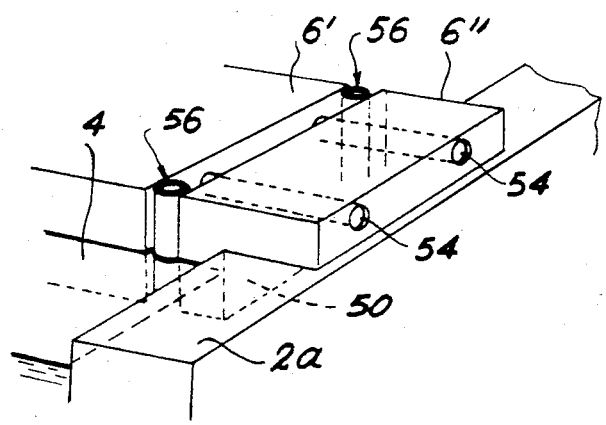

In the variant of FIG. 4, barrier comprises several sections, e.g. a main section 6′ and one or two lateral sections 6″. In the case shown, the barrier has two sections. Only one end is shown. Sections 6′ and 6″ are movable relative to one another, e.g. by means of pegs or pins 54 fixed to section 6′ and engaged in the corresponding holes of section 6″, in which they slide with a slight clearance. Elastic tubes 56, e.g. made from elastomer are fixed between sections 6′ and 6″ to one or other of the said parts. These tubes ensure an adequate pressure of faces 50 against walls 2a to ensure a satisfactory seal. The tubes could be replaced by elastomer blocks, e.g. of silicone rubber.

The devices described with reference to FIGS. 2 to 4 have the advantage of offering an absolute seal, even if the width of the tank is not strictly the same throughout, i.e. constant in the lengthwise direction.

Figure 6:
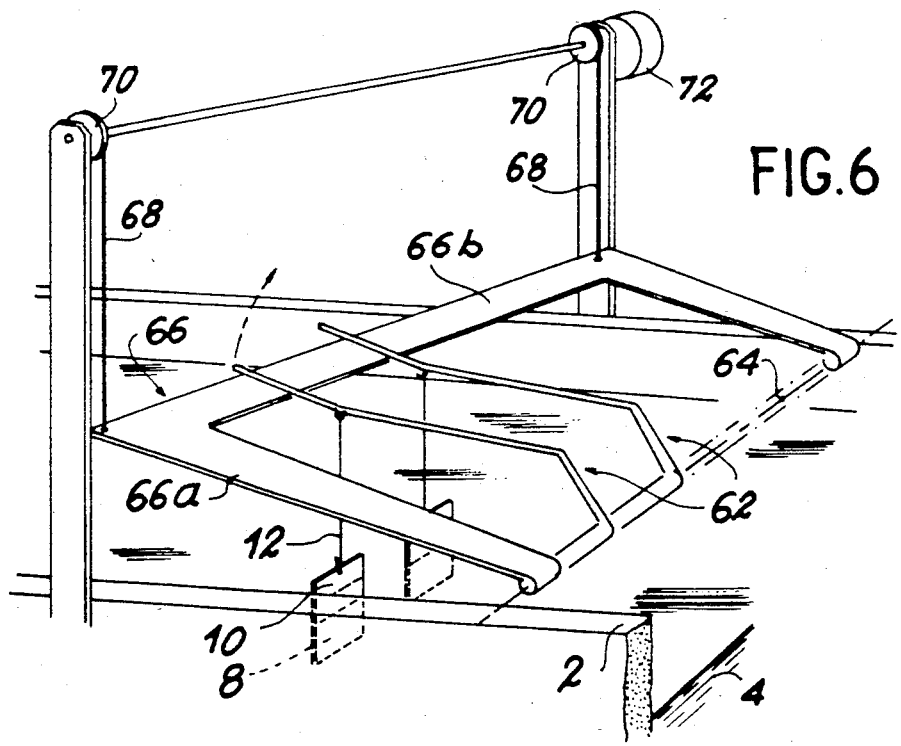
FIG. 6 is a perspective view of preferred means for vertically displacing the substrate.

FIG. 6 shows a preferred construction of the means for raising or lowering the substrate or substrates. The substrate-holding clamps or clips 12 are fixed to one end of an arm 62, which pivots about a horizontal axis 64. A support arm 66 is pivotally mounted about the same axis 64 and has two arms 66a and a cross-bar 66b. Two wires 68 wound on to pulleys 70 driven by an electric motor 72 make it possible to raise or lower support arm 66. During the deposition of the film on the substrate, arms 62 rest on cross-bar 66′. The displacement of support arm 66 is programmed. This device has the advantage of making it possible to rapidly raise the substrates. Thus, although the speed of motor 72 can be accelerated so as to shorten the time taken to raise the substrates, lifting still takes a by no means negligible time. However, as has been described hereinbefore, the deposition of the monomolecular films takes place under a neutral gas covering and leaks thereof must be prevented. During the introduction and raising of the substrate, it is necessary to open the movable flaps 44. It is desirable for said opening to be as short as possible. This is made possible by the manual raising of the substrate as a result of the device of FIG. 6. This device also has the advantage of maintaining the precise positioning of the substrates, so that they can be placed in exactly the same position as occupied before being raised. It is also possible to preposition the support arm 66 with arms 62 raised.

Figure 7:
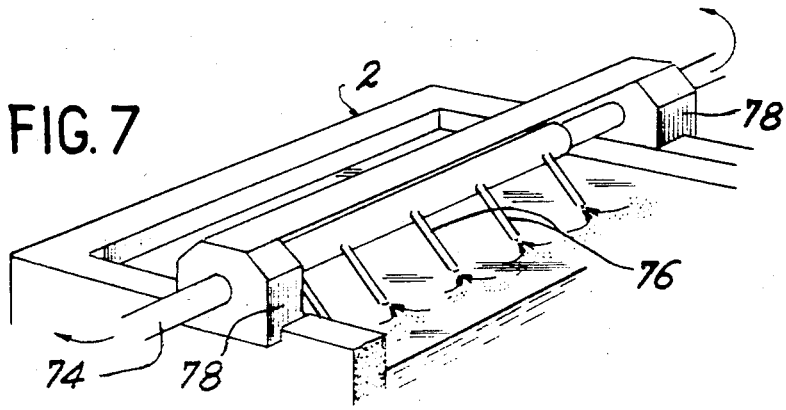
FIG. 7 is means for cleaning the tank liquid.

FIG. 7 shows means according to the invention for permitting the cleaning of the tank surface. This device comprises a tube 74 and a series of capillaries, i.e. thin tubes fixed to tube 74. Capillaries 76 are parallel and issue into tube 74, being positioned radially with respect to the latter. Tube 74 is mounted on two supports 78. It is orientable in rotation, so as to make it possible to bring the end of the capillaries to the surface of the liquid 4. Moreover, tube 74 can be displaced in translation along its longitudinal axis, so as to displace the capillaries on the surface of the water. Tube 74 is connected to a vacuum source by a not shown set a taps. This device permits the rapid, easy cleaning of the tank surface by the suction of film residues floating on the surface following a deposition operation. The mobile barrier 6 can be advantageously used for forcing film residues towards the orifices of capillaries 76. This device is foolproof, efficient and particularly robust. A device similar to that of FIG. 7 is located at either end of tank 2. Two devices make it possible to clean the entire surface of the liquid in the tank.

The displacement of the mobile barrier and the raising of the substrate are controlled by electronics, which are insensitive to power failures and in which the numerators and memories are mechanical. As a result of power failure safety devices, if the power supply is interrupted the system is stopped and the information retained. The rest of the program is taken up on current return. This makes it possible to operate automatically at night.

The tank according to the invention also has a film reserve safety means, permitting the automatic stopping of the movement of the substrate in the upper position prior to the film quantity available on the surface of the water being exhausted. Thus, in a conventional manner, the substrate is immersed in water and is raised in order to be covered with a plurality of films. It is not possible to resume the formation of an interrupted film, it is necessary for each deposited film to be complete. Consequently a regulatable contact is provided on the path of mobile barrier 6 and is advantageously electronic. In this way it can be so regulated that the space between it and the substrate determines an adequate surface to ensure that the film quantity covering it ensures the deposition of a complete film during a lowering and raising of the substrate. When the barrier reaches the contact, the system controls the stopping of the substrate movement in the raised position, following the end of the lifting movement of the substrate after the instant at which the barrier reached the mobile contact. This device makes it possible to take optimum advantage of the film quantity spread on the water without human intervention being necessary. In particular it makes it possible to operate and stop at night.

Finally, the tank has a permanent automatic control of the level of the water. The water admission circuit is designed in such a way that it does not introduce impurities into the conductivity water used. A tube crushing electrovalve is used to stop the admission of water. The mobile armature of an electromagnetic relay in the rest position bears against a flexible tube and releases the latter when tension is applied. The water level can be taken in several different ways. It can be taken to the rear of the mobile barrier in a film-free area using a contact-equipped float. The float contact can be advantageously constituted by two crossed graphite rods or one graphite rod crossed with a metal wire. It can also be taken by means of an optical device and can then take place to the front or rear of the mobile barrier. It can also be taken by an electrical device such as an electric wire flush with the water.

The permanent control of the water level prevents any deviations in connection with the surface tension measurements and permits prolonged use of the tank without any control or inspection being necessary.

The compression of the film takes place without human control. Thus, the control of the mobile barrier comprises a regulatable speed limiter acting without any modification of the gain of the loop or the chosen surface pressure.

A drainage system prevents the handling of large quantities of liquid. This system uses a vacuum source advantageously formed by a water jet pump for sucking up the liquid contained in the tank. The separation between the conductivity water of the tank and the dirty water of the water jet pump takes place automatically by means of a loop or bend above the level of the tank in the piping. This loop or bend is provided with a capillary air inlet. This microleak also makes it possible to overcome leaks of the taps in the circuitry.

What is claimed is:

1. A tank for the deposition of a monomolecular film comprising a tank having walls with a horizontal rim and a base, the tank containing a liquid, a barrier defining two areas on the surface of the liquid, means for displacing the barrier on the surface of the liquid in a direction perpendicular to the barrier, a solvent placed on the surface of the liquid and containing dissolved molecules, at least one substrate, means for displacing the substrate in a vertical direction and means for measuring the tension on the surface of the liquid, wherein the level of the liquid is below the horizontal rim of the tank, the barrier having a break at each of its ends and resting on the edges of the tank by said break, the break also defining a narrower portion which is partly submerged in the liquid of the tank, sealing means being provided between the faces of the narrower portion and the facing walls.

2. A tank according to claim 1, wherein the means for displacing the barrier are constituted by a first and second pulley located at a first end of the tank, by four pulleys located at a second end of the tank, by a motor driving a capstan and by a cable passing over each of the said pulleys and rotated by the capstan, the ends of the barrier being fixed to the cable and moving in the same direction.

3. A tank according to claim 2, wherein the barrier has a bracket detachably fixed to the said barrier, the cable being fixed to the ends of the bracket.

4. A tank according to claim 1, wherein the sealing means are constituted by a scraping tape fixed to the face of the barrier.

5. A tank according to claim 1, wherein the barrier is constituted by several sections, which are displaceable relative to one another in translation, elastic means being positioned between the sections.

6. A tank according to claim 1, wherein the means for displacing the substrate comprise a support arm pivoting about a horizontal axis, said support arm being raisable and lowerable by means of a motor, at least one arm pivoting at a first end about the same axis as the support arm and resting thereon, the substrate being suspended on the arm, the tank being closed by a frame containing a neutral gas atmosphere, said frame having an opening closed by a mobile flap for the introduction and extraction of the substrate.

7. A tank according to claim 1, wherein it comprises means for cleaning the surface of the liquid, said means being constituted by a horizontal tube maintained on two pivots and being displaceable in rotation and translation on said pivots, a plurality of parallel capillaries being radially fixed to the tube, to which are connected suction means.

8. A tank according to claim 1, wherein it has a film reserve safety means constituted by a regulatable contact, which detects the passage of the mobile barrier and controls the means for stopping the substrate in the raised position after completing the cycle.

9. A tank according to claim 1, wherein it comprises water level control means constituted by a tube crushing electrovalve and by a level taking device which controls the electrovalve.

* * * * *